United States Patent
Darfeuil et al.

(10) Patent No.: US 11,459,960 B2
(45) Date of Patent: Oct. 4, 2022

(54) METHOD FOR CHECKING THE MAXIMUM AVAILABLE POWER OF A TURBINE ENGINE OF AN AIRCRAFT EQUIPPED WITH TWO TURBINE ENGINES

(71) Applicant: SAFRAN HELICOPTER ENGINES, Bordes (FR)

(72) Inventors: Pierre Darfeuil, Moissy-Cramayel (FR); Patrick Marconi, Moissy-Cramayel (FR); Caroline Seve, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 503 days.

(21) Appl. No.: 16/500,285

(22) PCT Filed: Mar. 30, 2018

(86) PCT No.: PCT/FR2018/050802
§ 371 (c)(1),
(2) Date: Jan. 30, 2020

(87) PCT Pub. No.: WO2018/185409
PCT Pub. Date: Oct. 11, 2018

(65) Prior Publication Data
US 2021/0108578 A1    Apr. 15, 2021

(30) Foreign Application Priority Data
Apr. 3, 2017   (FR) ........................................ 1752849

(51) Int. Cl.
*F02C 9/42* (2006.01)
*B64D 27/10* (2006.01)
(Continued)

(52) U.S. Cl.
CPC ............... *F02C 9/42* (2013.01); *B64D 27/10* (2013.01); *B64D 31/02* (2013.01); *F02C 6/20* (2013.01);
(Continued)

(58) Field of Classification Search
CPC ... F02C 6/20; F02C 9/42; B64D 27/04; B64D 27/10; B64D 31/02; B64D 31/06;
(Continued)

(56) References Cited

U.S. PATENT DOCUMENTS

| | | | |
|---|---|---|---|
| 2013/0203021 A1 | 8/2013 | Beaud et al. | |
| 2013/0204468 A1* | 8/2013 | Camhi | G05B 23/0283 701/100 |

(Continued)

FOREIGN PATENT DOCUMENTS

| | | | |
|---|---|---|---|
| EP | 2 624 239 A1 | 8/2013 | |
| WO | WO 2012/059671 A2 | 5/2012 | |

(Continued)

OTHER PUBLICATIONS

French Search Report dated Nov. 28, 2017 in French Patent Application No. 1752849 (with English translation of Category of Cited Documents), 3 pages.

(Continued)

*Primary Examiner* — Loren C Edwards
(74) *Attorney, Agent, or Firm* — Oblon, McClelland, Maier & Neustadt, L.L.P.

(57) ABSTRACT

A method for checking the maximum available power of a turbine engine of an aircraft equipped with two turbine engines configured to operate in parallel and together to supply a necessary power to the aircraft during a flight phase includes: placing one of the turbine engines in a maximum take-off power regime, and adjusting a power supplied by the other turbine engine, such that the turbine engines (Continued)

continue to supply the necessary power to the aircraft during the flight phase; determining a power supplied by the turbine engine placed in the maximum take-off power regime, and processing the supplied power determined in this way, in order to deduce a piece of information relating to the maximum available power.

12 Claims, 4 Drawing Sheets

(51) Int. Cl.
    *B64D 31/02*     (2006.01)
    *F02C 6/20*     (2006.01)

(52) U.S. Cl.
    CPC .. *F05D 2220/329* (2013.01); *F05D 2270/053* (2013.01); *F05D 2270/093* (2013.01)

(58) Field of Classification Search
    CPC ........... F05D 2220/329; F05D 2260/80; F05D 2260/83; F05D 2270/053; F05D 2270/093; F01D 21/003
    See application file for complete search history.

(56) References Cited

U.S. PATENT DOCUMENTS

| | | |
|---|---|---|
| 2013/0219905 A1 | 8/2013 | Marconi et al. |
| 2017/0101938 A1 | 4/2017 | Lescher et al. |

FOREIGN PATENT DOCUMENTS

| | | |
|---|---|---|
| WO | WO 2012/059671 A3 | 5/2012 |
| WO | WO 2015/145041 A1 | 10/2015 |

OTHER PUBLICATIONS

International Search Report dated Jun. 13, 2018 in PCT/FR2018/050802 filed Mar. 30, 2018.

* cited by examiner

METHOD FOR CHECKING THE MAXIMUM AVAILABLE POWER OF A TURBINE ENGINE OF AN AIRCRAFT EQUIPPED WITH TWO TURBINE ENGINES

TECHNICAL FIELD

The present invention relates to a method for checking the maximum available power of an aircraft turbine engine, in particular a helicopter, comprising two turbine engines operating in parallel.

STATE OF THE ART

In a known manner, a helicopter is equipped with two turbine engines operating in parallel, each one being designed in an oversized manner in order to be able to keep the helicopter flying in an event of failure of the other turbine engine. In these operating engine speeds dedicated to managing an inoperative turbine engine, called OEI (One Engine Inoperative), the valid turbine engine supplies a power well beyond its nominal power for allowing the helicopter to pursue its flight and to land safely.

By way of example, the flowchart illustrated on FIG. 1 represents the required total power variation Pw according to time "t" to succeed in carrying out a rescue mission for survivors of a shipwreck by means of a helicopter comprising two turbine engines. This mission comprises six main phases:
- a taking off phase "A" which can use up the said maximum power PMD upon take-off;
- a coasting flight phase "B" to the search area carried out at a power lower than the PMD power;
- a search phase "C" in the search area at low altitude over the water which is carried out at low power, less than the PMD power and the phase B power, in such a way as to maximise exploration time;
- a rescue phase "D" in hovering flight which may require a power of the order of that deployed upon take-off;
- a return to base "E" phase, comparable to coasting flight B in terms of power; and
- a landing phase "F" which can even mean using the said maximum PMD take-off power.

By "PMD", it should be understood as maximum take-off power, that is to say, maximum power that can be used during take-off and landing phases for a duration of 5 minutes maximum.

The flowchart of FIG. 1 particularly illustrates that the phases of take-off A, hovering flight D and landing F require the turbine engines to output significant power with respect to the other flight phases.

Hence, it will be understood that in the event of failure of one of the turbine engines, it is essential to ensure that the other turbine engine is able to provide sufficient power to ensure take-off A, hovering flight D and landing F phases, to prevent the helicopter from initiating a descent in hostile environment. This sufficient power corresponds to the power of OEI engine speeds.

However, it is not possible to test an aircraft in OEI engine speed in as far as, in such a engine speed, the valid turbine engine provides a level of power that is much higher than the PMD and thus, gets damaged in a way that the turbine engine can no longer be used without heavy maintenance action.

Furthermore, the availability of the PMD power is not verified at each take-off. In fact, it often occurs that the take-off conditions (mass, ambient conditions, range, performance class) do not require that the turbine engines supply PMD power, the pilot usually trying to minimise the load of the turbine engines for the sake of power saving.

Hence, it has been necessary to develop strategies to ensure maximum power availability in OEI engine speed for each of the turbine engines.

When this is possible without it causing damage to the turbine engines, a first strategy consists in performing, during a technical flight, for example every 500 hours of flight, a check of the maximum rotation speed of each of the turbine engines. This maximum rotation speed check of the turbine engines is then completed by an EPC check (Engine Power Check) carried out during a commercial flight, for example daily. During this EPC check, a series of measurements of temperature and rotational speed are carried out at a set power, for each of the turbine engines in order to determine if, from a thermodynamic aspect, each of the turbine engines would have the capacity to supply maximum power in each engine speed, particularly at take-off or in OEI engine speed.

When it is not possible to conduct the first strategy without risking damaging the turbine engines, a second strategy consists in carrying out an EPC check during a commercial flight, for example every 25 hours of flight, and to complete it by specific maintenance operations with the purpose of detecting any possible undetected failures regarding certain components of the helicopter engine.

However, these two strategies, are unsatisfactory.

In fact, the check of the maximum rotation speed of each of the turbine engines should be carried out in dedicated test areas. However, these test areas can be difficult to access by the operator in his geographic area of air control.

Furthermore, the EPC check is performed at a level that is significantly lower than the PMD power level, thus, increasing uncertainty as to the turbine engine capacity to supply maximum power in each engine speed, particularly upon take-off and in OEI engine speed.

Finally, maintenance operations are particularly tricky and complicated to implement, as they require in particular specific tools and qualified staff without which maintenance error risks are high.

PRESENTATION OF THE INVENTION

The purpose of the present invention is to overcome the aforementioned issues by proposing a method for checking the maximum available power in the event that one of the turbine engines of an aircraft equipped with two turbine engines operating in parallel is inoperative (OEI engine speed), wherein the power of the two turbine engines is out of alignment during flight, one of the turbine engines thus, being controlled to operate in engine speed at maximum take-off power.

More particularly, the object of the invention is a method for checking the maximum available power in OEI engine speed of a turbine engine of an aircraft equipped with two turbine engines configured to operate in parallel and together provide the aircraft with the necessary power during a flight phase, said method comprising the following steps:
- placing a first of the turbine engines at a engine speed substantially equal to a engine speed at maximum take-off power, and
- adjusting a power supplied by a second turbine engine, such that the turbine engines keep supplying the necessary power to the aircraft during the flight phase,
- determining a power supplied by the turbine engine placed in engine speed at maximum take-off power, and processing the thus, determined supplied power in order to deduce an information pertaining to the maximum available power.

Such a method has the advantage of using the engine speed at maximum take-off power (PMD) to check that the turbine engine can output the maximum power in each engine speed, in particular in engine speeds corresponding to particularly high power such as the OEI engine speed. In fact, in this engine speed, the turbine engine does not risk becoming damaged, and the reached level of power is high enough to limit uncertainty regarding the turbine engine capacity to reach very high power.

Preferentially, the method further comprises a step of determining a threshold power, said threshold power corresponding to a minimum power to be reached by the turbine engine in a engine speed at maximum take-off power (PMD) in the event of failure of the other turbine engine, and a step of comparing the thus, determined supplied power with the threshold power.

The threshold power ($P_s$) is for example equal to the minimum power value stated by the manufacturer in the performance tables that serve to determine for the crew the permissible useful loads.

Advantageously, the method also comprises the following steps:
  measuring a typical temperature of the turbine engine, for example the temperature of the gases between the high pressure turbine and the low pressure turbine, said turbine engine being placed in engine speed at maximum take-off power (PMD), and
  comparing the thus, measured temperature with a predetermined threshold temperature, so as to ensure that the measured temperature is lower than the threshold temperature; and/or
  measuring a rotation speed of the turbine engine placed in engine speed at maximum take-off power, and
  comparing the thus, measured rotation speed with a predetermined threshold rotation speed, so as to ensure that the measured rotation speed is higher than or equal to the threshold rotation speed.

The threshold temperature ($T_s$) is for example equal to the minimum temperature value between the high pressure turbine of the gas generator and the low pressure turbine stated by the manufacturer in the performance tables which help the crew to determine the permissible useful loads. The threshold rotation speed ($NG_s$) is for example equal to the minimum value of nominal rotation speed NG of the turning parts of the gas generator stated by the manufacturer in the performance tables which help the crew determine the permissible useful loads.

In an alternative embodiment, the method also comprises a step of determining an operating power, said operating power corresponding to a minimum power guaranteeing a re-acceleration of the second of the turbine engines in the event of failure of the turbine engine placed in engine speed at maximum take-off power (PMD), and a step of adjusting the power of the turbine engines placed in engine speed at maximum take-off power (PMD) such that the power supplied by the second of the turbine engines remains higher than the thus, determined operating power.

Furthermore, the method can be automatically interrupted when one at least of the following conditions is fulfilled:
  the rotation speed of the high pressure shaft is lower than a first threshold rotation speed,
  the rotation speed of the low pressure shaft is lower than a second threshold rotation speed and higher than a third threshold rotation speed a failure is detected on one of the turbine engines.

The other object of the invention is a computer program product comprising code instructions for executing a method for checking the maximum available power of a turbine engine of an aircraft such as described beforehand when this program is executed by a processor.

Another object of the invention is a controlling device comprising a computer configured to implement a method for checking the maximum available power of a turbine engine of an aircraft equipped with two turbine engines intended to operate in parallel and supply together the aircraft with the necessary power during a flight phase such as previously described, said computer being configured to implement the following steps consisting in:
  placing a first of the turbine engines in a engine speed substantially equal to a engine speed at maximum take-off power, and
  adjusting a power supplied by a second of the turbine engines, such that the turbine engines continue supplying the aircraft with the necessary power during the flight phase,
  determining a power supplied by the turbine engine placed in the engine speed at maximum take-off power, and
  processing the thus, determined power supplied to deduce an information pertaining to the maximum available power.

Another object of the invention is an assembly comprising two turbine engines configured to operate in parallel and supply together a power necessary for the aircraft during a flight phase, said assembly being characterised in that it comprises a controlling device as described beforehand.

Another object of the invention is an aircraft comprising two turbine engines configured to operate in parallel and together to supply a power necessary for the aircraft during a flight phase, said aircraft comprising a computer configured to implement a method for checking the maximum available power of an aircraft turbine engine as described beforehand.

PRESENTATION OF THE FIGURES

Other characteristics, purposes and advantages of the invention will become apparent from the following description, which is purely for illustrative purposes and is non-limiting, and which should be read in light of the accompanying drawings, whereon:

DETAILED DESCRIPTION

Figure 1:
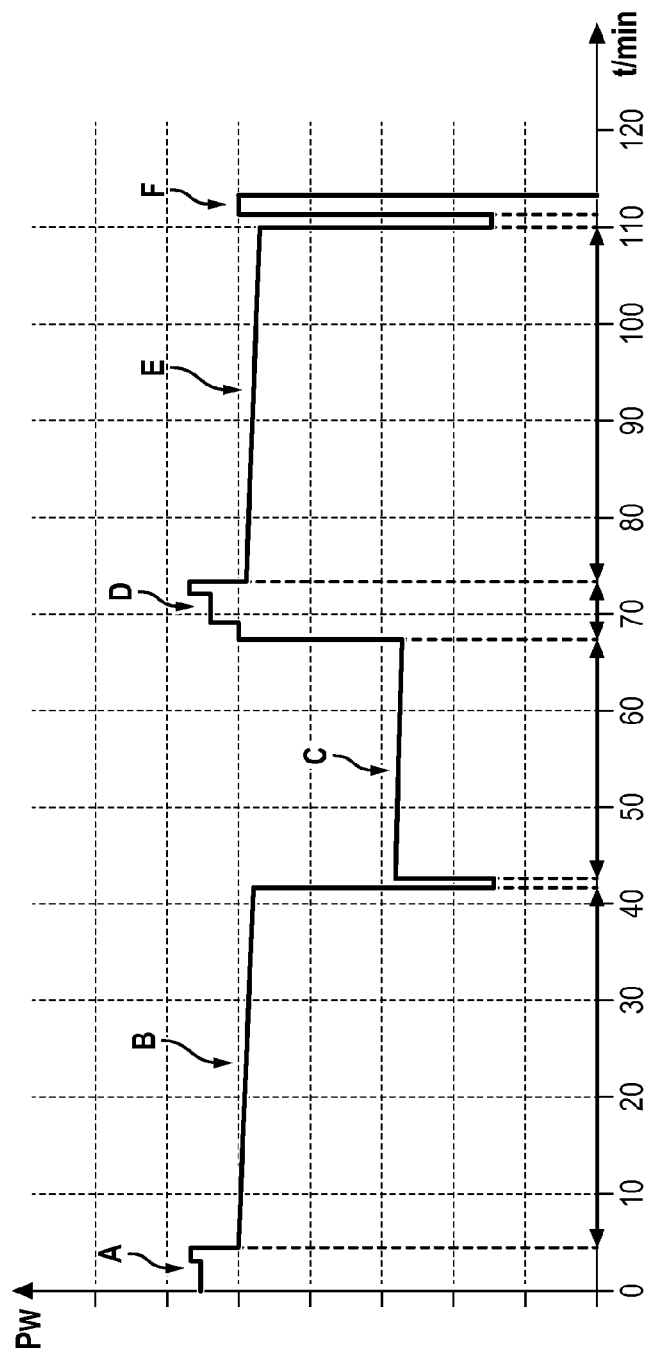
FIG. 1 (already described) is a diagram illustrating the total power variation required according to time to successfully carry out a shipwreck rescue mission by means of a helicopter comprising two turbine engines.
Figure 2:
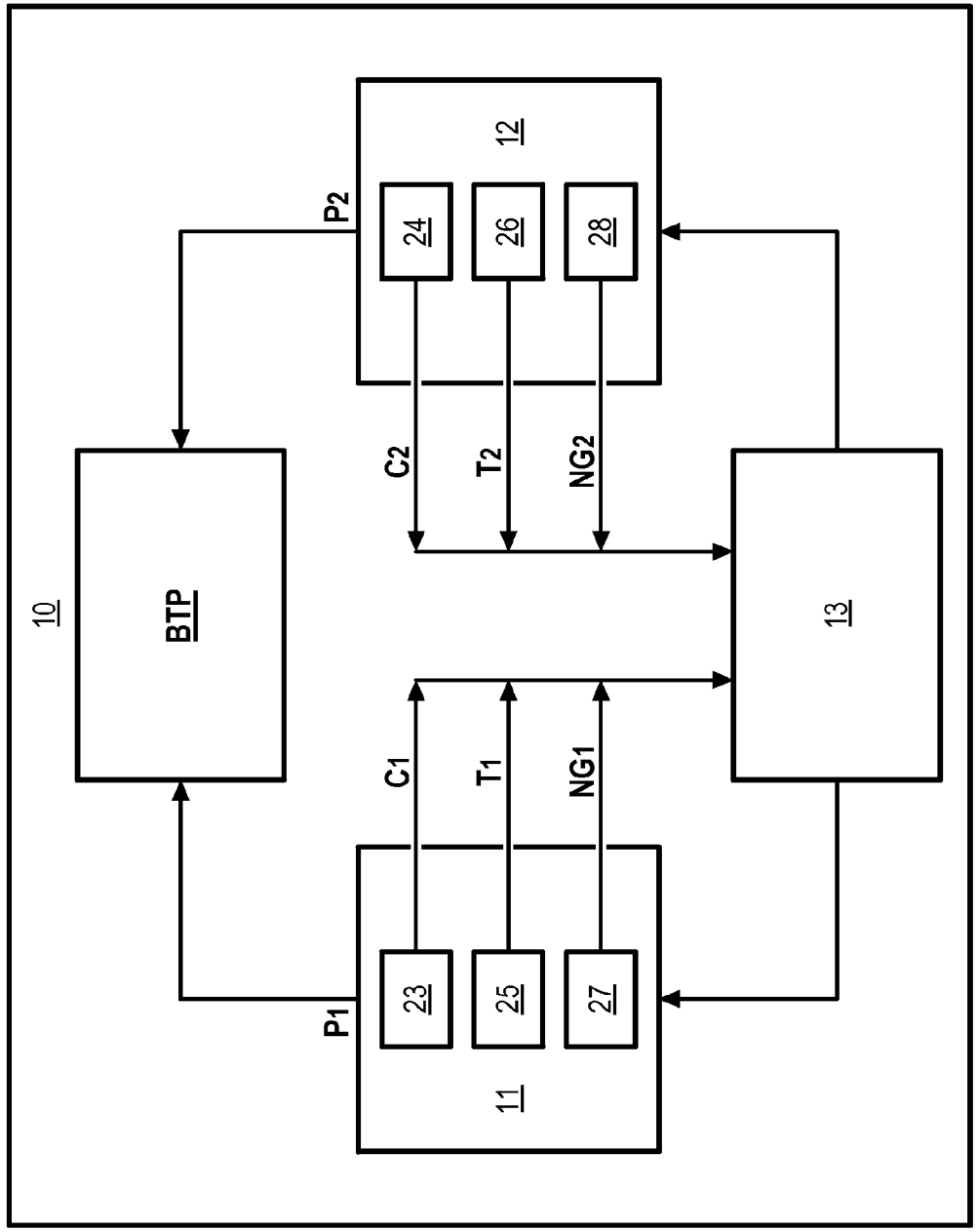
FIG. 2 is a schematic representation of a helicopter according to an embodiment of the invention.

FIG. 2 shows an aircraft 10, in particular a helicopter, comprising means for implementing a method 100 of checking the maximum available power of an aircraft 10 turbine engine according to an embodiment of the invention.

The helicopter 10 is equipped with a first turbine engine 11 and a second turbine engine 12 configured to operate in parallel and supply together a power $P_{1+2}$ required for the flight phase of the helicopter 10. More particularly, the first and second turbine engines respectively output a power $P_1$ and $P_2$ to a main transmission gearbox BTP so that the latter transmits the power $P_{1+2}$ to a main rotor (not represented) of the helicopter 10.

Each of the turbine engines 11, 12 comprises from upstream to downstream, in the flow direction of the gases, a fan, a low pressure compressor, a high pressure compressor, a combustion chamber, a high pressure turbine, a low pressure turbine and a gas exhaust nozzle.

Figure 3:
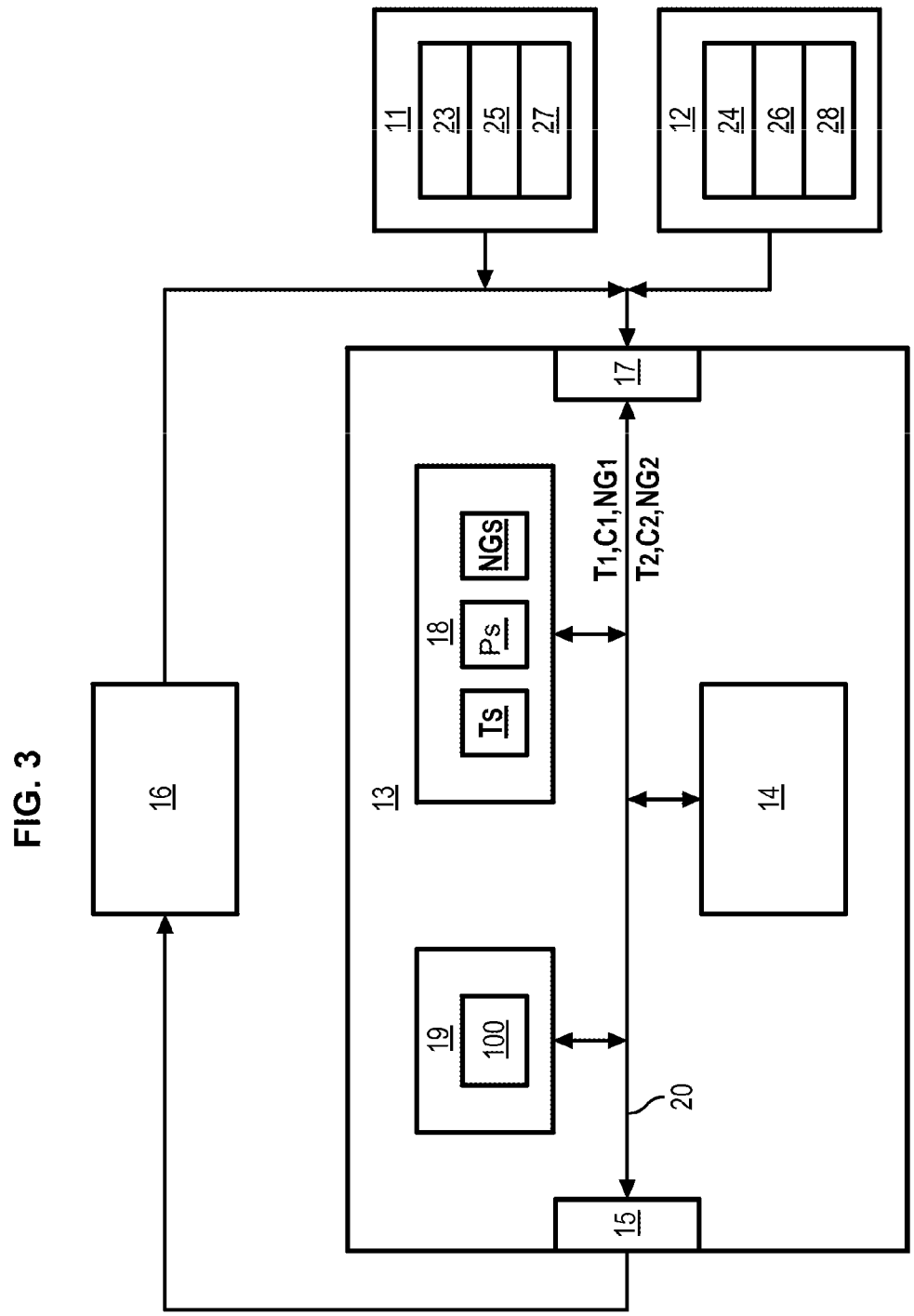
FIG. 3 is a schematic representation of a helicopter controlling device illustrated on FIG. 2.

The helicopter 10 is further equipped with a controlling device 13 of which FIG. 3 is a schematic representation.

The controlling device 13 comprises a computer 14 configured to send control instructions to the first turbine engine 11 and to the second turbine engine 12 by means of an output interface 15. More precisely, the computer 14 is configured to implement the following steps consisting in:
  placing one of the turbine engines 11, 12 in a engine speed that is substantially equal to a PMD power engine speed (step 101), and
  adjusting the power supplied $P_2$, $P_1$ by the other of the turbine engines 12, 11 (step 102), such that the turbine engines 11, 12 output the power $P_{1+2}$ required for the helicopter 10 during the flight phase thereof,
  determining the power supplied $P_1$, $P_2$ by the turbine engine 11, 12 placed in engine speed at maximum take-off power (PMD) (step 103), and
  processing the thus determined power supplied $P_1$, $P_2$ to deduce an information pertaining to the maximum available power (steps 105, 106).

The power $P_{1+2}$ is for example sent to the controlling device 13, in particular to the computer 14, by means of a user interface 16 connected to the controlling device 13 by an input interface 17. The user interface 16 can be further configured to display status information about the aircraft 10 for a pilot or operator. For this, the user interface 16 is also connected to the controlling device 13 by the output interface 15.

In order to guarantee a rapid re-acceleration in the event of failure of the turbine engine being tested (that is to say, the machine that is brought to the PMD engine speed), the power of the other turbine engine is adjusted according to the effective requirement of the helicopter 10 while remaining higher than a minimum power value guaranteeing such a re-acceleration. The compliance with this minimum power by the other turbine engine can then prevent the turbine engine being tested to reach PMD: however, the power attained by the turbine engine being tested remains sufficiently close to the PMD so that controlling can be carried out effectively.

The controlling device 13 can further comprise:
  a data memory 18 wherein for example are preregistered a predetermined threshold power $P_s$, a predetermined threshold temperature $T_s$ and a predetermined threshold rotation speed $NG_s$, which are used by the computer 14 as shall be explained in the rest of the description.
  a program memory 19 wherein is for example preregistered the method 100, and
  at least one communication bus 20.

As indicated above, the threshold power (Ps) is a minimum power to be reached by the turbine engine 11, 12 placed in PMD engine speed in the event of failure of the other turbine engine. It can for example be equal to the minimum power value declared by the manufacturer in the performance tables to help the crew determine the permissible useful loads.

The threshold temperature ($T_s$) is for example equal to the minimum temperature value between the high pressure turbine of the gas generator and the low pressure turbine declared by the manufacturer in the performance tables which are intended for the crew to determine the permissible useful loads.

The threshold rotation speed ($NG_s$) is for example equal to the minimum value of the nominal rotation speed NG of the turning parts of the gas generator declared by the manufacturer in the performance tables intended for the crew to determine the permissible useful loads.

In one embodiment, to process the power $P_1$, $P_2$ supplied by the turbine engine 11, 12 placed in the PMD power engine speed, the computer 14 is also configured to compare the power $P_1$, $P_2$ supplied by the turbine engine 11, 12 placed in the PMD power engine speed at threshold power $P_s$, so as to ensure that the power supplied $P_1$, $P_2$ is higher than or equal to the threshold power Ps.

More particularly, if the power $P_1$, $P_2$ supplied by the turbine engine 11, 12 placed in the PMD power engine speed is higher than or equal to the threshold power $P_s$, the computer 14 is for example configured to command the user interface 16 to inform the pilot or operator that the turbine engine 11, 12 placed in PMD power engine speed can supply the threshold power $P_s$. The threshold power $P_s$ hence corresponds to a guaranteed minimum power in the event of failure of the turbine engine 12, 11 whereof the power $P_2$, $P_1$ supplied is adjusted. On the contrary, that is to say, if the supplied power $P_1$, $P_2$ is lower than the threshold power $P_s$, the computer 14 can also be configured to command the user interface 16 to inform the pilot or operator that the turbine engine 11, 12 placed in the PMD power engine speed cannot supply the guaranteed minimum power and that there is a danger in the event of failure of the turbine engine 12, 11 whereof the supplied power $P_2$, $P_1$ has been adjusted.

So that the computer 14 can determine the power supplied $P_1$, $P_2$ by the turbine engines 11,12, each turbine engine 11, 12 comprises for example a measuring device 21, 22 connected to the controlling device 13 by the input interface 17 and comprising:
  a first sensor 23, 24 configured to measure a torque $C_1$, $C_2$ provided by the turbine engine 11, 12, and
  a second sensor 25, 26 configured to measure a rotation speed $NG_1$, $NG_2$ of the turbine engine 11, 12.

Measurement of the torques $C_1$ and $C_2$ can for example be carried out at the output of each turbine engine 11, 12, that is to say, at their intermediate input shaft of the transmission gearbox.

The computer 14 is thus configured to compute the power $P_1$, $P_2$ supplied by the turbine engine 11, 12 placed in PMD power engine speed based on torque measurements $C_1$, $C_2$ and the rotation speed $NG_1$, $NG_2$ carried out by the first and second sensors 23 to 26.

In one embodiment, the computer 14 can also be configured to compare a temperature $T_1$, $T_2$ measured between the high pressure turbine and the low pressure turbine of the turbine engine 11, 12 placed in PMD power engine speed at the threshold temperature $T_s$, so as to ensure that the measured temperature $T_1$, $T_2$ is lower than the threshold temperature $T_s$ (steps 108 to 110).

More particularly, if the temperature $T_1$, $T_2$ thus measured in the turbine engine 11, 12 placed in the PMD power engine speed is lower than the threshold temperature $T_s$, the computer 14 is for example configured to command the user interface 16 to inform the pilot or operator that the temperature $T_1$, $T_2$ does not exceed the threshold temperature $T_s$, that is to say, that the turbine engine 11, 12 placed in the PMD power engine speed does not overheat, when the engine is at maximum rotation speed corresponding to the PMD power engine speed (step 109).

In the opposite case, that is to say, if the measured temperature $T_1$, $T_2$ of the turbine engine 11, 12 placed in PMD power engine speed is higher than or equal to the threshold temperature $T_S$, the computer 14 can also be configured to command the user interface 16 to inform the pilot or the operator that the turbine engine 11, 12 placed in the PMD power engine speed overheats with this engine speed and that there exists a danger in the event of failure of the turbine engine 12, 11 whereof the supplied power $P_2$, $P_1$ has been adjusted (step 110).

In order to measure the temperature $T_1$, $T_2$ of the turbine engines 11, 12, the measuring device 21, 22 of each turbine engine 11, 12 comprises for example a third sensor 27, 28 configured to measure the temperature $T_1$, $T_2$ between the high pressure turbine and the low pressure turbine of the turbine engine 11, 12.

In one embodiment, the computer 14 can also be configured to compare a measured rotation speed $NG_1$, $NG_2$ of the turbine engine 11, 12 placed in the PMD power engine speed at the threshold rotation speed $NG_S$, such as to ensure that the measured rotation speed $NG_1$, $NG_2$ is higher than or equal to the threshold rotation speed $NG_S$ (steps 111-114).

More particularly, if the rotation speed $NG_1$, $NG_2$ of the turbine engine 11, 12 placed in the PMD power engine speed is higher than or equal to the threshold rotation speed $NG_S$, the computer 14 is for example configured to command the user interface 16 to inform the pilot or operator that the turbine engine 11, 12 placed in the PMD power engine speed can reach the threshold rotation speed $NG_S$, when the latter is at the maximum temperature corresponding to the PMD power engine speed (step 113).

In the opposite case, that is to say, if the rotation speed $NG_1$, $NG_2$ of the turbine engine 11, 12 placed in the PMD power engine speed is lower than the threshold rotation speed $NG_S$, the computer 14 can also be configured to command the user interface 16 to inform the pilot or operator that the rotation speed $NG_1$, $NG_2$ of the turbine engine 11, 12 placed in PMD power engine speed is limited by the maximum temperature corresponding to the PMD power engine speed and that there is a danger in the event of failure of the turbine engine 12, 11 whereof the supplied power $P_2$, $P_1$ has been adjusted (step 114).

In order to measure the rotation speed $NG_1$, $NG_2$ of the turbine engines 11, 12, the measuring device 21, 22 of each turbine engine 11, 12 comprises for example the second aforementioned sensor 25, 26.

In one embodiment, the checking method 100 is automatically interrupted when one at least of the three following conditions is fulfilled:
- the rotation speed N1 of the high pressure shaft is lower than a threshold rotation speed $N1_S$
- the rotation speed N2 of the low pressure shaft is lower than a threshold rotation speed $N1_{S1}$ and higher than a threshold rotation speed $N1_{S1}$ and/or
- a failure is detected on one of the turbine engines 11, 12 (OEI engine speed).

Figure 4:
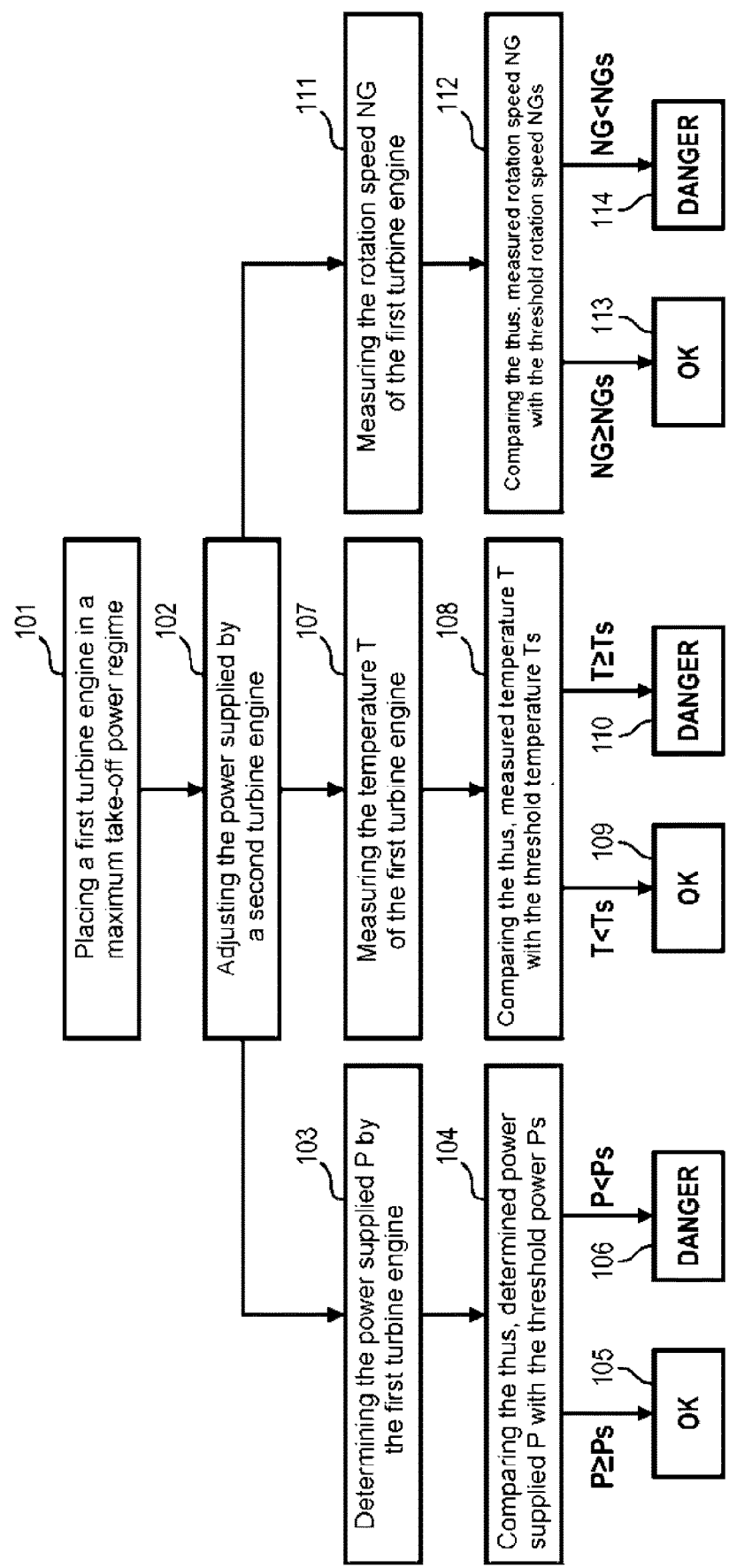
FIG. 4 illustrates a method for checking the maximum available power of a turbine engine of an aircraft according to an embodiment of the invention.

The FIG. 4 shows a method 100 of checking the maximum available power of one of the turbine engines 11, 12 of the helicopter 10.

The method 100 is for example initiated by the pilot or the operator by means of the user interface 16.

Preferably, the method 100 is carried out during each flight for each turbine engine 11, 12. In other words, at each flight, it is preferable to check the maximum power that each of the turbine engines 11, 12 is able to supply.

Furthermore, the method 100 is preferably carried out during a flight phase throughout which the result of a failure of any one of the turbine engines 11, 12 would be minimal, for example during a coasting phase, near a diversion surface.

The method 100 comprises the following steps:
- placing one of the turbine engines 11, 12 in the PMD power engine speed (101), and
- adjusting the supplied power $P_2$, $P_1$ by the other turbine engine 12, 11 (102), such that the turbine engines 11, 12 output the power $P_{1+2}$ required for the helicopter 10 during its flight phase.
- determining a power $P_1$, $P_2$ supplied by the turbine engine 11, 12 placed in the engine speed at maximum take-off power (PMD) (103), and
- processing the thus, determined supplied power $P_1$, $P_2$ to deduce an information pertaining to the maximum available power (104).

Preferably, the processing step 104 is carried out by comparing the thus, determined supplied power $P_1$, $P_2$ with the threshold power $P_S$, such as to ensure that the supplied power $P_1$, $P_2$ is higher than or equal to the threshold power $P_S$.

If need be, the power of the other turbine engine 12, 11 is adjusted according to the effective requirement of the helicopter while remaining higher than a minimum power value guaranteeing such a re-acceleration.

Then, if the power $P_1$, $P_2$ supplied by the turbine engine 11, 12 placed in the PMD power engine speed is higher than or equal to the threshold power $P_S$, the method 100 comprises for example a step 105 during which the pilot or the operator is informed that the turbine engine 11, 12 placed in PMD power engine speed can supply the guaranteed minimum power.

On the contrary, that is to say, if the power $P_1$, $P_2$ supplied by the turbine engine 11, 12 placed in PMD power engine speed is lower than the threshold power $P_S$, the method 100 comprises for example a step 106 during which the pilot or the operator is informed that the turbine engine 11, 12 placed in PMD power engine speed cannot supply the guaranteed minimum power and that there is a danger in the event of failure of the turbine engine 12, 11 whereof the supplied power $P_2$, $P_1$ has been adjusted.

The power $P_1$, $P_2$ supplied by the turbine engine 11, 12 placed in PMD power engine speed is for example determined during the steps consisting in:
- measuring the torque $C_1$, $C_2$ supplied by the turbine engine 11, 12;
- measuring the rotation speed $NG_1$, $NG_2$ of the turbine engine 11, 12 and
- computing the power $P_1$, $P_2$ supplied by the turbine engine 11, 12 placed in PMD power engine speed based on the measurements of torque $C_1$, $C_2$ and rotation speed $NG_1$, $NG_2$ performed beforehand.

The method 100 can also comprise the following steps:
- measuring the temperature $T_1$, $T_2$ between the high pressure turbine and the low pressure turbine of the turbine engine 11, 12 placed in PMD power engine speed (107), and
- comparing the thus, measured temperature $T_1$, $T_2$ with the threshold temperature $T_S$, in such a way as to ensure that the measured temperature $T_1$, $T_2$ is lower than the threshold temperature $T_S$ (108).

Then if the temperature $T_1$, $T_2$ by the turbine engine 11, placed in PMD power engine speed is lower than the threshold temperature $T_S$, the method 100 comprises for example a step 109 during which the pilot or the operator is informed that the turbine engine 11, 12 has not overheated on the PMD power engine speed, when the engine is at maximum rotation speed corresponding to the PMD power engine speed.

In the opposite case, that is to say, if the temperature $T_1$, $T_2$ by the turbine engine 11, 12 placed in the PMD power engine speed is lower than the threshold temperature $T_S$, the method 100 for example comprises a step 110 during which the pilot or the operator is informed that the turbine engine 11, 12 placed in the PMD power engine speed overheats on this engine speed and that there is a danger in the event of failure of the turbine engine 12, 11 whereof the supplied power $P_2$, $P_1$ has been adjusted.

The method 100 can also comprise the following steps:
- measuring 111 the rotation speed $NG_1$, $NG_2$ of the turbine engine 11, 12 placed in PMD power engine speed, and comparing 112 the thus measured rotation speed $NG_1$, $NG_2$ with the threshold rotation speed $NG_S$, such as to ensure that the measured rotation speed $NG_1$, $NG_2$ is higher than or equal to the threshold rotation speed $NG_S$.

Then, if the rotation speed $NG_1$, $NG_2$ of the turbine engine 11, 12 placed in the PMD power engine speed is higher than or equal to the threshold rotation speed $NG_S$, the method 100 comprises for example a step 113 during which the pilot or the operator is informed that the turbine engine 11, 12 placed in the PMD power engine speed can reach the threshold rotation speed $NG_S$, when the latter is at maximum temperature corresponding to the PMD power engine speed.

On the contrary, that is to say, if the rotation speed $NG_1$, $NG_2$ is lower than the threshold rotation speed $NG_S$, the method 100 comprises for example a step 114 during which the pilot or operator is informed that the rotation speed $NG'_1$, $NG_2$ of the turbine engine 11, 12 placed in PMD power engine speed is limited by the maximum temperature corresponding to the PMD power engine speed and that there is a danger in the event of failure of the turbine engine 12, 11 whereof the supplied power $P_2$, $P_1$ has been adjusted.

The aforementioned helicopter 10 and method 100 allow us to ensure that each turbine engine 11, 12 is able to output maximum power in each engine speed, in particular in engine speeds corresponding to particularly high power such as on take-off (PMD power) or OEI engine speed.

Particularly, the fact of using the PMD power engine speed to check the maximum available power of each turbine engine 11, 12 is particularly advantageous as far as that in this engine speed, the level of power supplied by the turbine engine 11, 12 does not risk damaging it.

The fact of using the PMD power engine speed to check the maximum available power of each turbine engine 11, 12 also has the following advantages:
- anticipating undetected or underlying failures of the turbine engines 11, 12 or of the engine fuel circuit (clogging, erosion, corrosion, creep, strikes, vibrations, cracking, plugging, leaks, etc.),
- reducing the duration of exposure to undetected failure, in particular when the method 100 is carried out at each flight for each turbine engine 11, 12,
- causing a possible fault of the turbine engine 11, 12 placed in PMD power engine speed in flight conditions, particularly in coasting phase, in conditions where consequences of such a fault are minimised. In fact, in the event of a fault of any of the turbine engines 11, 12 the other turbine engine 12, 11 shall be less used in coasting phase than in any other flight phase, thereby, limiting the risks of cascade effects, that is to say, the loss of any of the turbine engines 11, 12, then of the other turbine engines 12, 11,
- avoiding maintenance operations and hence human interventions on the turbine engines 11, 12 which can, themselves generate new risks,
- being able to be completed by a known EPC,
- allowing the checking method 100 to be applied on any type of flight, and particularly a commercial flight, the helicopter 10 not being in a single-engine flight,
- guaranteeing a sufficiently short restarting time for the turbine engine that has not been tested whatever the flight conditions, so as to ensure an easy landing of the helicopter in OEI engine speed.

The turbine engine 11, 12 data collected during the method 100 can further be stored in the data memory 18 with a view to be analysed on the ground such as to determine if the turbine engine 11, 12 can keep being used or not. The results of these analyses allow for example to better ensure the maximum available power of the turbine engine 11, 12 in each engine speed for the following flights.

Finally, the method 100 also has the advantage of being able to be carried out on any type of flight (commercial or technical) and to not hinder the latter whether it be in terms of speed, altitude, etc.

The invention claimed is:

1. A method of checking a maximum available power of a turbine engine of an aircraft equipped with two turbine engines configured to operate in parallel and together to supply the aircraft with a necessary power during a flight phase, said method comprising:
    placing a first of the two turbine engines in an engine speed equal to an engine speed at maximum take-off power,
    adjusting a power supplied by a second of the two turbine engines, so that the two turbine engines keep supplying the aircraft with the necessary power during the flight phase,
    determining a power supplied by the first turbine engine while the first turbine engine is being placed in the engine speed at maximum take-off power, and
    processing the thus determined supplied power in order to deduce an information pertaining to the maximum available power.

2. The method according to claim 1, further comprising:
    determining a threshold power, said threshold power corresponding to a minimum power to be reached by the turbine engine placed in the engine speed at maximum take-off power in an event of failure of the other turbine engine,
    comparing the thus determined supplied power with the threshold power.

3. The method according to claim 1, wherein the turbine engine placed in the engine speed at maximum take-off power comprises a high pressure turbine and a low pressure turbine, the method further comprising:
    measuring a temperature of the gases between the high pressure turbine and the low pressure turbine of the turbine engine placed in the engine speed at maximum take-off power, and
    comparing the measured temperature with a predetermined threshold temperature, so as to ensure that the measured temperature is lower than the threshold temperature.

4. The method according to claim 1, further comprising:
    measuring a rotation speed of the turbine engine placed in the engine speed at maximum take-off power, and comparing the measured rotation speed with a predetermined threshold rotation speed so as to ensure that the measured rotation speed is higher than or equal to the threshold rotation speed.

5. The method according to claim 1, further comprising:
determining an operating power, said operating power corresponding to a minimum power guaranteeing a re-acceleration of the second of the two turbine engines in an event of failure of the turbine engine placed in the engine speed at maximum take-off power, and
adjusting the power of the turbine engine placed in the engine speed at maximum take-off power such that the power supplied by the second of the two turbine engines remains higher than the determined operating power.

6. The method according to claim 1, wherein the turbine engine placed in the engine speed at maximum take-off power comprises a high pressure shaft and a low pressure shaft, and wherein the method is automatically interrupted when at least one of the following conditions is fulfilled:
rotation speed of the high pressure shaft is lower than a first threshold rotation speed,
rotation speed of the low pressure shaft is lower than a second threshold rotation speed and higher than a third threshold rotation speed,
a failure is detected on one of the two turbine engines.

7. A non-transitory computer readable medium comprising code instructions for executing the method according to claim 1 when the code instructions are executed by a processor.

8. A controlling device comprising a computer configured to implement the method according to claim 1, said computer being configured to implement the following steps:
placing the first turbine engine in the engine speed equal to the engine speed at maximum take-off power,
adjusting the power supplied by the second turbine engine, such that the two turbine engines continue supplying the aircraft with the necessary power during the flight phase,
determining the power supplied by the first turbine engine while the first turbine engine is being placed in the engine speed at maximum take-off power, and
processing the thus determined power supplied to deduce the information pertaining to the maximum available power.

9. An assembly comprising two turbine engines configured to operate in parallel and together to supply a necessary power for an aircraft during a flight phase, said assembly comprising the controlling device according to claim 8.

10. An aircraft comprising two turbine engines configured to operate in parallel and together to supply a necessary power for the aircraft during a flight phase, said aircraft comprising a computer configured to implement the method according to claim 1.

11. A method of checking a maximum available power of a turbine engine of an aircraft equipped with two turbine engines configured to operate in parallel and together to supply the aircraft with a necessary power during a flight phase, said method comprising:
placing a first of the two turbine engines in an engine speed equal to an engine speed at maximum take-off power,
adjusting a power supplied by a second of the two turbine engines, so that the two turbine engines keep supplying the aircraft with the necessary power during the flight phase,
determining a power supplied by the turbine engine placed in the engine speed at maximum take-off power,
determining a threshold power, said threshold power corresponding to a minimum power to be reached by the turbine engine placed in the engine speed at maximum take-off power in an event of failure of the other turbine engine, and
comparing the thus determined supplied power with the threshold power.

12. A method of checking a maximum available power of a turbine engine of an aircraft equipped with two turbine engines configured to operate in parallel and together to supply the aircraft with a necessary power during a flight phase, said method comprising:
placing a first of the two turbine engines in an engine speed equal to an engine speed at maximum take-off power,
determining an operating power, said operating power corresponding to a minimum power guaranteeing a re-acceleration of a second of the two turbine engines in an event of failure of the turbine engine placed in the engine speed at maximum take-off power,
adjusting a power of the turbine engine placed in the engine speed at maximum take-off power such that a power supplied by the second of the two turbine engines remains higher than the determined operating power,
determining a power supplied by the turbine engine placed in the engine speed at maximum take-off power, and
processing the thus determined supplied power in order to deduce an information pertaining to the maximum available power.

* * * * *